United States Patent Office 3,822,294
Patented July 2, 1974

3,822,294
3-ACETOXY-3-(3' - CARBOMETHOXY-4'-ACETOXY-1' - NAPHTHYL)NAPHTHALIDE - 1,8 AND A METHOD FOR ITS PREPARATION
Efthimios Chinoporos, Cambridge, and Paul S. Huyffer, West Boxford, Mass., assignors to Polaroid Corporation, Cambridge, Mass.
No Drawing. Continuation-in-part of abandoned application Ser. No. 216,254, Jan. 7, 1972. This application Dec. 1, 1972, Ser. No. 311,682
Int. Cl. C07d 1/06
U.S. Cl. 260—343.2 R          12 Claims

ABSTRACT OF THE DISCLOSURE

This invention relates to the synthesis of 1-naphthol naphthalide and then converting the 4'-acetoxy to a 4'-acetoxy - 1' - naphthyl)naphthalide intermediate and a 1-naphthol to yield the corresponding 3,3-disubstituted naphthalide and then converting the 4'-acetoxy to a 4'-hydroxy group to give the dye product.

BACKGROUND OF THE INVENTION

Cross Reference to Related Applications

This application is a continuation-in-part of U.S. Patent Application Ser. No. 216,254 filed Jan. 7, 1972 now abandoned.

(1) Field of the invention

This invention relates to a novel method of preparing indicator dyes and to novel intermediates useful in the preparation thereof.

(2) Description of the prior art

Dyes which undergo a change in spectral absorption characteristics in response to a change in pH are well known in the art and frequently are referred to as indicator or pH-sensitive dyes. Typically, these dyes change from one color to another, from colored to colorless or from colorless to colored on the passage from acidity to alkalinity or the reverse and are commonly employed in analytical chemical procedures to measure changes in pH value. Among the indicator dyes most widely used is the group derived from phthaleins as exemplified by phenolphthalein, thymolphthalein o-cresolphthalein and 1-naphtholphthalein.

A particularly useful method of preparing phthalein indicator dyes including both phthalides and naphthalides of certain hydroxy-substituted carbocyclic compounds and certain N-heterocyclic aryl compounds forms the subject matter of copending U.S. Patent Application Ser. No. 108,662 of Alan L. Borror filed Jan. 21, 1971. According to the method disclosed and claimed therein, such dyes are prepared (1) by reacting (a) a hydroxy-substituted carbocyclic aryl compound selected from a phenol and a 1-naphthol or an N-heterocyclic compound selected from an indole and a pyrrole and (b) phthalaldehydric or naphthalaldehydric acid to form the corresponding (na)phthalidyl-substituted intermediate; (2) oxidizing the intermediate; and (3) reacting the oxidation product with a carbocyclic or N-heterocyclic compound to form the complete dye. The expression "(na)phthalidyl" is intended to denote either the corresponding phthalidyl- or naphthalidylsubstituted intermediate depending upon the selection of phthalaldehydic or naphthalaldehydic acid.

This reaction scheme is illustrated below wherein A" represents the starting phenol, naphthol, indole or pyrrole which ultimately comprises the A radical of the indicator dye and B' represents the carbocyclic aryl or heterocyclic aryl compound which ultimately comprises the B radical of the indicator dye and X represents the carbon atoms necessary to complete the phthalide or naphthalide moiety.

(1)

(2)

(3)

Since the reaction conditions of the above method are comparatively mild, the starting materials need not be limited to the more stable compounds. For example, the more sensitive indole and phenolic compounds and their derivatives may be employed without decomposition and/or loss of substituents that frequently occurs in the Friedel-Crafts syntheses conventionally used in the production of phthaleins. Besides the greater latitude in the selection of starting materials, the oxidized intermediates may be reacted with any of various aromatic compounds to form a wide variety of indicator dyes including symmetrical, unsymmetrical and mixed phthalide and naphthalide dyes.

The present invention is concerned with an improved method in the production of indicator dyes by the reaction of a 1-naphthol naphthalide intermediate and a 1-naphthol to yield the corresponding naphthalide dye.

SUMMARY OF THE INVENTION

It is, therefore, the primary object of the present invention to provide an improved method of synthesizing indicator dyes.

It is another object of the present invention to provide a method of synthesizing 1-naphthol naphthalides which may be symmetrical or unsymmetrical indicator dyes.

It is a further object of the present invention to provide novel intermediates useful in the preparation of such dyes.

Other objects of this invention will in part be obvious and will in part appear hereinafter.

The invention accordingly comprises the process involving the several steps and the relation and order of one or more of such steps with respect to each of the others and the product possessing the features, properties and the relation of elements which are exemplified in the following detailed disclosure and the scope of the application of which will be indicated in the claims.

According to the present invention, an improved method of preparing 1-naphthol naphthalides is provided wherein the improvement comprises reacting an adduct of naphthalaldehydic acid and a 1-naphthol as the diester, in particular, by reacting a 3-acetoxy-3-(4'-acetoxy-1'-naphthyl)naphthalide with a 1-naphthol to form the corresponding 3,3-disubstituted naphthalide and then converting the 4'-acetoxy to a hydroxy group to yield the indicator dye product.

For a fuller understanding of the nature and objects of the present invention reference should be had to the following detailed description.

DESCRIPTION OF THE PREFERRED EMBODIMENTS

According to the present invention, it has been found that 1-naphthol naphthalides may be produced in considerably improved yields by employing a naphthalidyl-naphthol adduct as the diester, e.g., as the benzoate, propionate and most conveniently, by employing a diacetate intermediate for reaction with the 1-naphthol. Besides the increase in yields, this method is suitable and convenient for producing such dyes on a large scale and finds particular utility in the preparation of carboxynaphthol naphthalides wherein one or both of the naphthyl radicals possess a carboxy substituent ortho to the naphtholic —OH. The latter dyes, for example, may be produced in consistently high yields in excess of 40% by weight.

Specifically, the method of the present invention comprises:

(A) Reacting a solution of (a) a 3-acetoxy-3-(4'-acetoxy-1'-naphthyl)naphthalide and (b) a 1-naphthol in inert organic media at elevated temperature to form the corresponding 3 - (4'-acetoxy - 1' - naphthyl)-3-(4'-hydroxy-1'-naphthyl)naphthalide and (B) Converting said 4'-acetoxy group to a hydroxy group to form the corresponding 3,3-disubstituted naphthalide wherein said 3,3- substituents are 4'-hydroxy-1'-naphthyl radicals, the same or different.

In another embodiment, the method of the present invention includes the step of treating a 3-hydroxy-3-(4'-hydroxy-1'-naphthyl)naphthalide or a 3-(4'-oxo-1'-naphthylidene)naphthalide with acetic anhydride in the presence of an acetylation catalyst to form the corresponding 3-acetoxy-3-(4'-acetoxy-1'-naphthyl)naphthalide.

In a preferred embodiment, naphthol naphthalides wherein one and preferably both of the hydroxynaphthyl radicals contain a carboxy substituent are prepared employing a 3-acetoxy-3-(3'-COOR-4'-acetoxy-1'-naphthyl)naphthalide, wherein R is H or alkyl and preferably is lower alkyl having 1 to 4 carbon atoms, for example, as illustrated in the following reaction scheme.

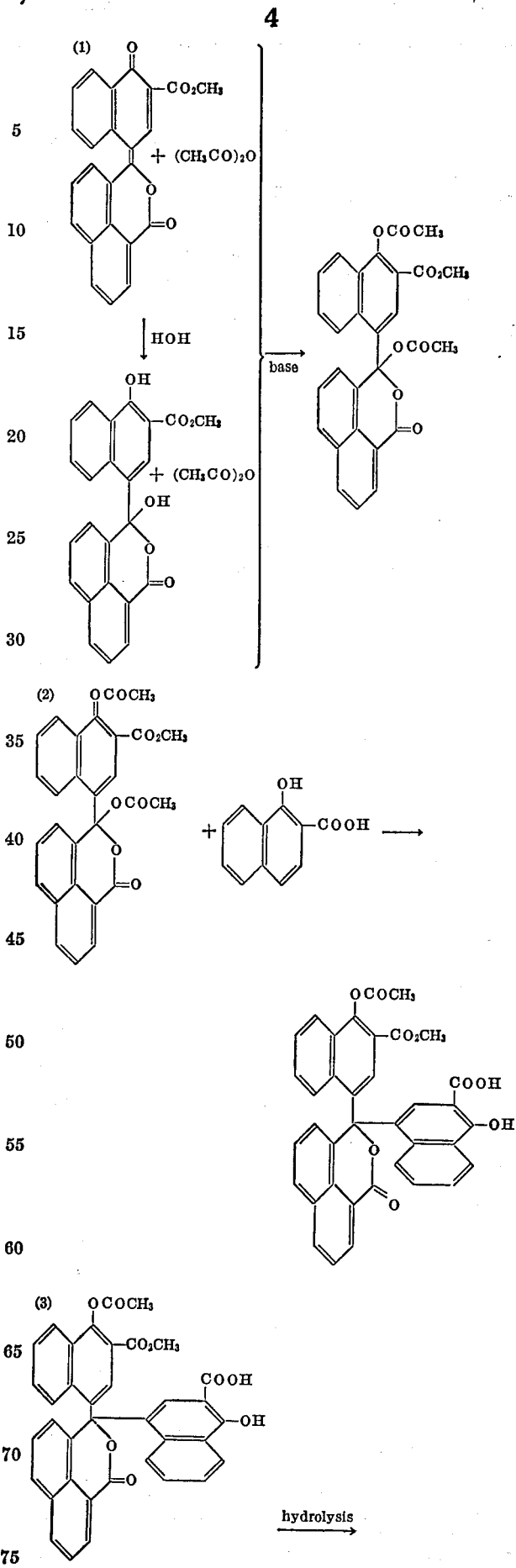

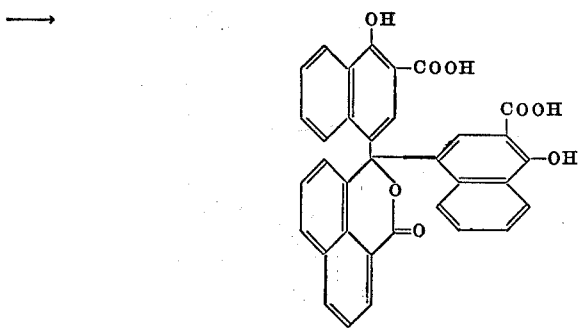

Typical of the indicator dyes that may be prepared according to the present invention are those represented by the formula:

(I) 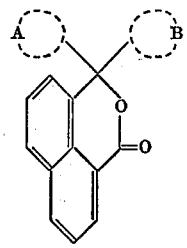

wherein A and B are 4'-hydroxy-1'-naphthyl radicals, the same or different.

The indicator dyes defined above and as represented in the above formula may contain additional substituents as may be desired which do not interfere with the function of the dye for its selected ultimate use. Typical substituents include alkyl, such as, methyl, ethyl, isopropyl, n-butyl, t-butyl, hexyl, octyl, dodecyl, hexadecyl, octadecyl and eicosanyl; aryl, such as, phenyl, 2-hydroxyphenyl, and naphthyl; alkaryl, such as, benzyl, phenethyl, phenylhexyl, p-octylphenyl, p-dodecylphenyl; alkoxy, such as, methoxy, ethoxy, butoxy, 1-ethoxy-2-(β-ethoxyethoxy), dodecyloxy and octadecyloxy; aryloxy, such as, phenoxy, benzyloxy, naphthoxy; alkoxyalkyl, such as, methoxyethyl, dodecyloxyethyl; halo, such as, fluoro, bromo, and chloro; trifluoroalkyl, such as, trifluoromethyl, mono- and bis-trifluoromethyl carbinol; sulfonamido; sulfamoyl; acyl and its derivatives; aminomethyl; amido; sulfonyl; sulfo; cyano; nitro; amino including mono- and disubstituted amino, e.g., N-ethyl amino and N,N'-dimethylamino; carboxy; and hydroxyl. Such substituents may be substituted on one or both of the naphthyl radicals and/or on the naphthalide ring-closing moiety.

For use as optical filter agents in photographic processes, such as, diffusion transfer processes employing highly alkaline processing solutions, it may be desirable that the indicator dye selected as the optical filter agent possess a relatively high pKa so that the dye will be in a light-absorbing form during the initial stages of processing and yet may be rendered substantially non-light absorbing within a relatively brief interval as the pH subsequent to substantial image formation is reduced in order to permit early viewing of the image. Such dyes may be prepared according to the present invention by appropriate selection of the 1-naphthols which ultimately comprise the A and/or B radicals. For example, the naphthol naphthaleins having a carboxy substituent ortho to the naphtholic —OH produced according to the preferred embodiment possess a relatively high pKa which makes them useful as optical filter agents in the aforementioned processes, and particularly where the 1-naphthol selected to provide the B radical also contains a carboxy group substituted on a carbon atom adjacent to the functional —OH. Alternatively, the A and/or B radicals may contain hydrogen-bonding groups other than carboxy groups.

As an illustration, in Formula (I) above, the A radical may comprise

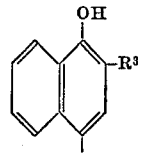

wherein $R^3$ is a hydrogen-bonding group and the B radical may comprise

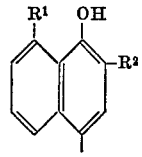

wherein one of $R^1$ and $R^2$, and preferably $R^2$, is a hydrogen-bonding group and the other is hydrogen. High pKa 1-naphthol phthaleins and naphthaleins substituted with hydrogen-bonding groups in this manner form the subject matter of copending U.S. Patent Application Ser. No. 103,865, filed Jan. 4, 1971.

As the $R^1$, $R^2$ or $R^3$ group, any hydrogen-bonding group may be used that is capable of raising the pKa. The association of two atoms through hydrogen to form a hydrogen bond between or within molecules is well known. When hydrogen is attached to an electronegative atom, for example, O or N, the resultant bond is polarized. If directed toward another atom (M) with an unshared pair of electrons, the hydrogen acts as a bridge between the atoms (O—H . . . M) due to the electrostatic attraction to both atoms between which the hydrogen proton can be transferred. In the above compounds an intramolecular hydrogen bond is formed between the p-hydroxy group and the adjacent hydrogen-bonding group, i.e., a group containing a heteroatom possessing an active unshared pair of electrons, such as, O, N, S or halogen, e.g., F., which has a free electron pair or a negative charge in basic solution and which is capable of forming a 5-, 6- or 7-membered and preferably a 5- or 6-membered hydrogen-bonded ring with the functional, i.e., naphtholic —OH. Preferably, the heteroatom in the hydrogen-bonding group has attached to it a proton which is more acidic than the proton on the naphtholic —OH and ionizes in basic solution to a negative charge. Such groups include, for example, carboxy; hydroxy; o-hydroxyphenyl; bis trifluoromethyl carbinol; sulfonamido (—NH—$SO_2$—R' wherein R' may be alkyl, aryl, alkaryl); and sulfamoyl (—$SO_2$—NH—R" wherein R" may be alkyl, aryl, alkaryl). Suitable R' and R" substituents include branched or straight chain alkyl, e.g., methyl, ethyl, isopropyl, n-butyl, t-butyl, hexyl, octyl, dodecyl, hexadecyl, octadecyl and eicosanyl; aryl, e.g., phenyl and naphthyl; and alkaryl, e.g., benzyl, phenethyl, phenylhexyl, p-octylphenyl and p-dodecylphenyl.

Specific examples of 1-naphthol indicator dyes that may be prepared according to the method of the present invention are as follows:

(1) 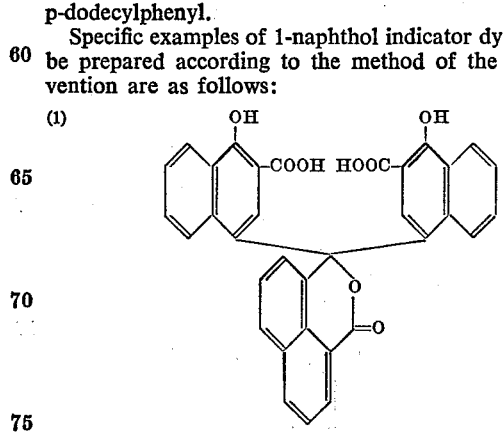

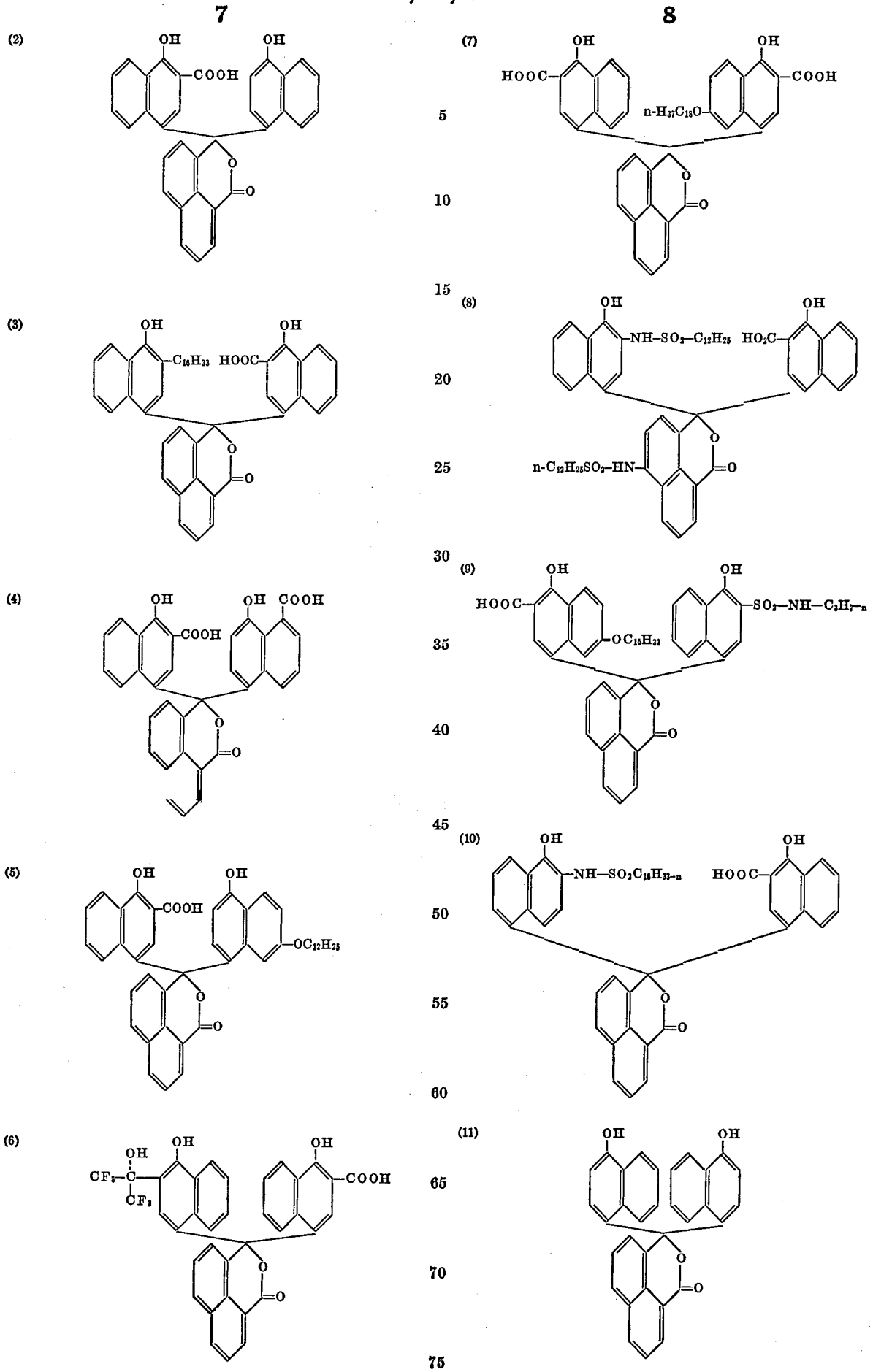

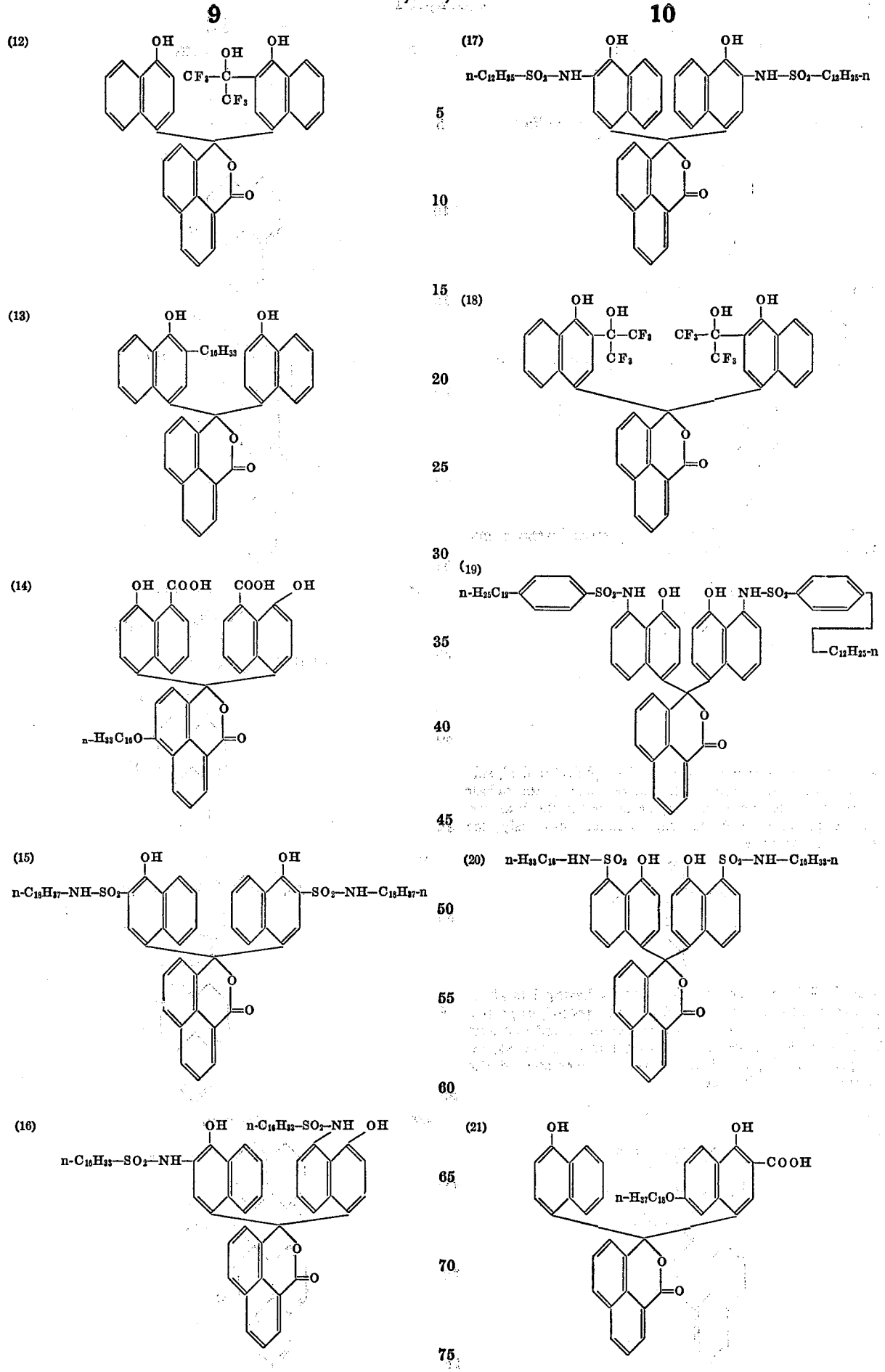

(22) 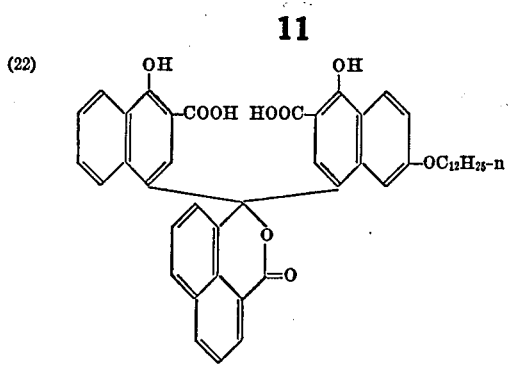

(23) 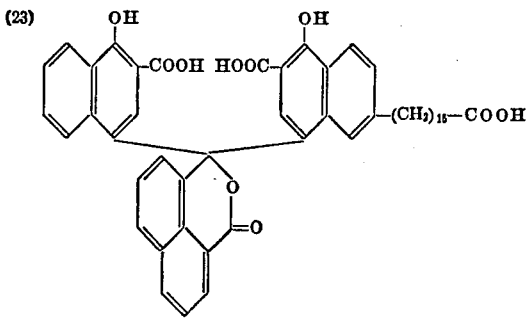

The novel intermediates of the present invention may be represented by the formula:

(II) 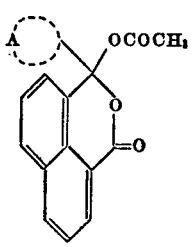

wherein A represents a 4'-acetoxy-1'-naphthyl radical, substituted or unsubstituted. Illustrative substituents include those enmerated above as may be desired in the final dye. In the preferred embodiment, as noted previously, the A radical comprises

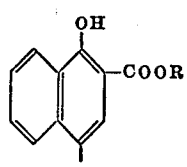

wherein R is hydrogen or alkyl, usually having 1 to about 20 carbon atoms, such as, methyl, ethyl, propyl, isopropyl, butyl t-butyl, octyl, decyl, dodecyl, octadecyl and eicosanyl Preferably, R is lower alkyl having 1 to 4 carbon atoms.

Specific examples of the novel intermediates of the present invention include:

(24) 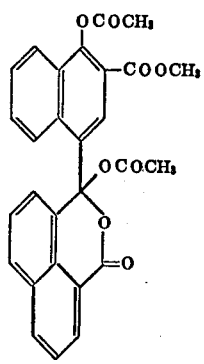

(25) 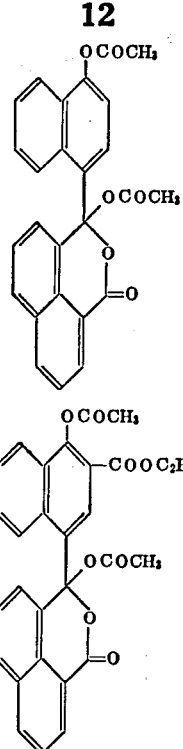

(26) 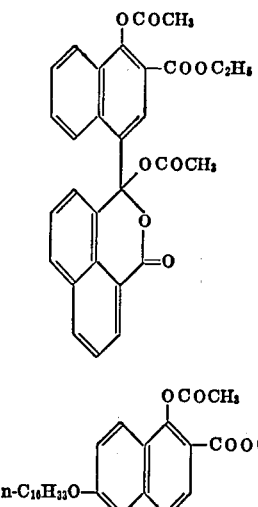

(27) 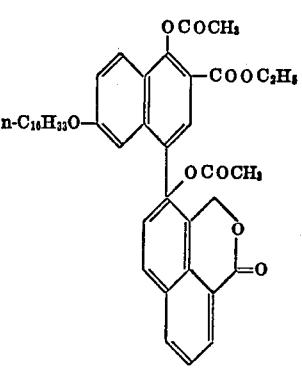

(28) 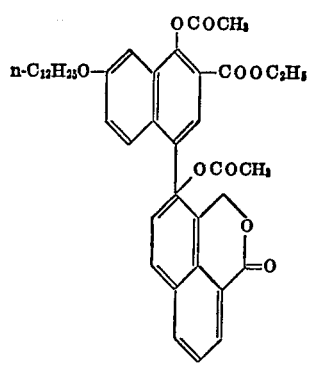

(29) 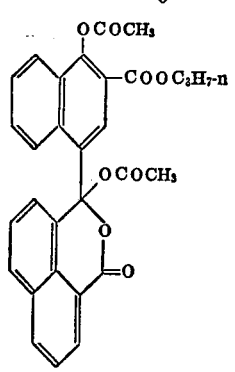

(30) 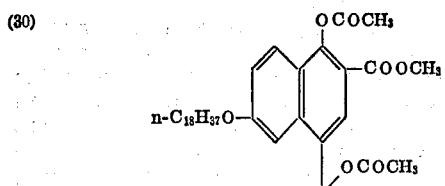
(31) 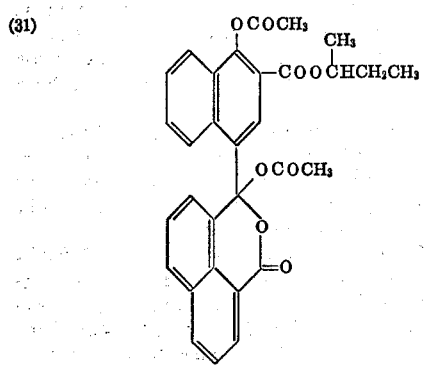
(32) 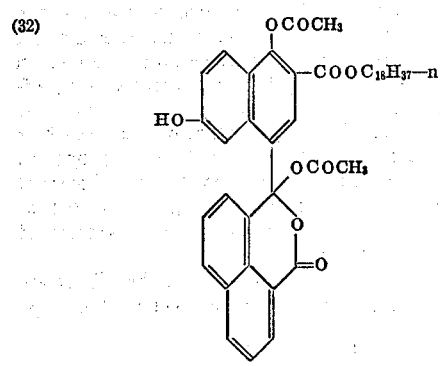
(33) 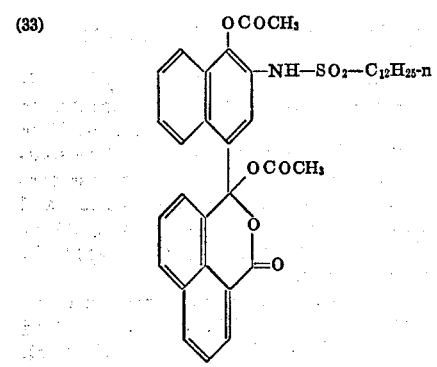
(34) 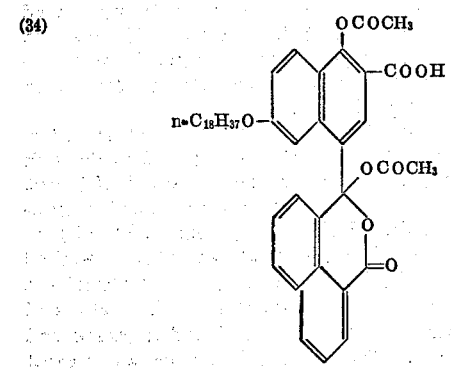
(35) 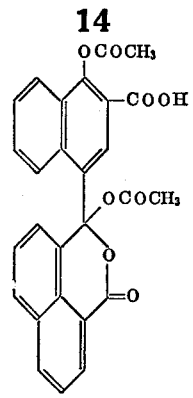
(36) 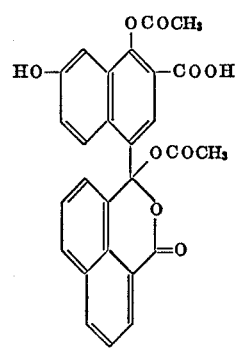
(37) 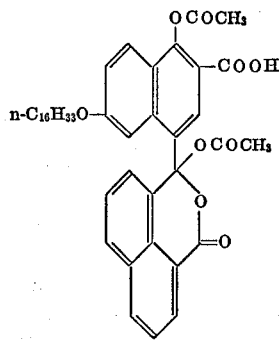
(38) 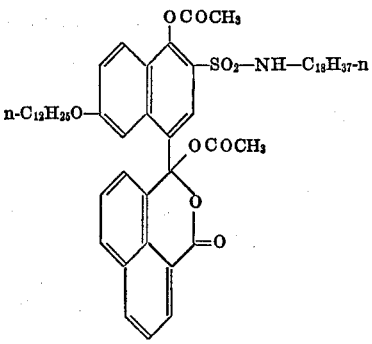
(39) 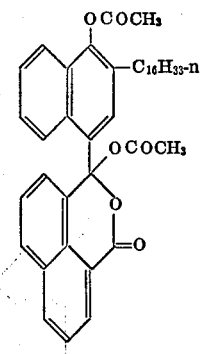
The above intermediates may be prepared by reacting the oxidation product(s) of a 1:1 adduct of naphthalaldehydric acid and a 1-naphthol with an acetylation agent in the presence of an acetylation catalyst, for example, by reacting a dehydro compound, i.e., a 3-(4'-oxo-1'-naphthylidene)naphthalide or a ketol compound, i.e., a 3-hydroxy - 3 - (4'-hydroxy - 1' - naphthyl)naphthalide with acetic anhydride in the presence of a strong acid or a base. Preferably, the above intermediates are prepared by reacting a 3-hydroxy-3-(4'-hydroxy-1'-naphthyl)naphthalide and acetic anhydride in the presence of a basic acetylation catalyst, for example, sodium acetate, phenyl acetate, triethylamine and preferably, pyridine. The reaction temperature may vary over a wide range from room temperature up to about 120° C. To achieve a practical reaction rate, however, the reaction is conducted at elevated temperature, ordinarily between about 80° C. and 100° C. The acetic anhydride and ketol may be reacted in stoichiometric amounts, but preferably, the anhydride is used in excess. The amount of base usually ranges between about 0.1 and 1.0 equivalent per equivalent of ketol. Though the acetylation may be carried out in an inert organic liquid which is a solvent for the reactants, the reaction is conveniently carried out by simply heating the ketol in acetic anhydride at the appropriate temperature in the presence of pyridine.

The ketol compound employed in the above reaction may be prepared according to the method disclosed and claimed in aforementioned copending application Ser. No. 108,662 by reacting naphthalaldehydic acid and a 1-naphthol in the presence of an acid catalyst to form the 1:1 naphthalidyl-naphthol adduct. The adduct thus obtained may be oxidized to form the ketol directly or oxidized under anhydrous conditions to form a dehydro intermediate which upon hydration yields the ketol. Whether the oxidation is conducted in the presence or absence of moisture, the product obtained should be hydrated to ensure complete conversion to the ketol prior to forming the acetate. To prepare the carboxy-substituted compounds of the preferred embodiment, the naphthalaldehydic acid is reacted with a 1-hydroxy-2-naphthoic acid (2-carboxy-1-naphthol) or a 1-hydroxy-2-alkyl naphthoate (2-carboalkoxy-1-naphthol).

The ketol also may be prepared by other methods. For example, 3-hydroxy-3-(3'-carboalkoxy-4'-hydroxy-1'-naphthyl)naphthalide may be prepared by forming a complex solution of a 1-hydroxy-2-alkyl naphthoate by reacting the naphthoate with anhydrous aluminum chloride followed by the addition of solvent, such as, nitrobenzene and then reacting the complex solution with 3,3-dichloro naphthalide. This reaction sequence is illustrated below.

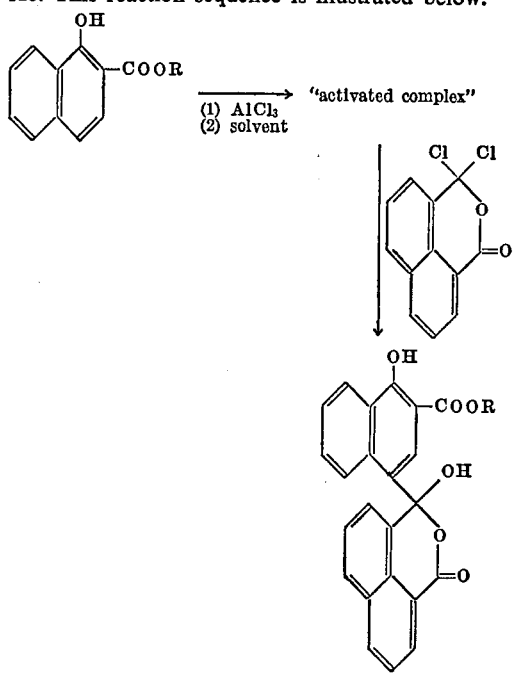

In synthesizing naphthol naphthalides according to the present invention, a 3-acetoxy-3-(4'-acetoxy-1'-naphthyl) naphthalide intermediate and a 1-naphthol are reacted in substantially equimolar proportions in inert organic media to form the corresponding 3,3-disubstituted naphthalide. The reaction media may comprise any organic liquid(s) that is a solvent for the reactants, such as, acetonitrile, methylethylketone, ethanol, hexane, 1,4-dioxane, tetrahydrofuran, toluene, benzene, cyclohexane, dimethylsulfoxide, methylene chloride, dimethoxyethane and N,N-dimethylformamide. An acid catalyst, e.g., a Lewis acid catalyst may be used, if desired, but ordinarily the reaction is conducted in the absence of a catalyst.

The 1-naphthol selected for reaction with the acetoxy intermediate may contain one or more substituents as may be desired in the final dye provided that it has an unsubstituted 4-position, i.e. a free position para to the naphtholic —OH group. Illustrative substituents are those enumerated above.

The reaction of the intermediate and naphthol may be carried out at room temperature or elevated temperature. The appropriate temperature may be readily detemined empirically depending upon the reactants, and usually ranges between about 80° C. and 100° C.

Conversion of the 4'-acetoxy group of the 3,3-disubstituted naphthalide to a hydroxy group may be accomplished in any suitable and convenient manner, for example, by hydrolysis, preferably alkaline hydrolysis. Conversion to the hydroxy group is conveniently achieved by treating the 3,3-disubstituted naphthalide obtained above with an alkaline hydroxide in aqueous or aqueous alcohol solution. The alkaline hydroxide may be an alkaline earth hydroxide, such as, calcium or barium hydroxide or preferably, an alkali metal hydroxide, such as, sodium or potassium hydroxide. The alcohol employed is usually a lower alkanol, such as, methanol, ethanol or propanol. It will be appreciated that carboalkoxy groups, if present as in the preferred embodiment, also are converted to the free acid group simultaneously with the conversion of the acetoxy to the hydroxy group.

The following Example is given to further illustrate the present invention and is not intended to limit the scope thereof.

EXAMPLE

Preparation of the compound of formula (7)

(1) A mixture of 2 g. (0.00496 mole) of 3-hydroxy-3-(3'-carbomethoxy - 4' - hydroxy-1'-naphthyl)naphthalide and 20 ml. acetic anhydride containing 0.5 ml. pyridine was stirred on the steam bath for one-half hour. The solution was then cooled in an ice bath. The crystalline precipiate was filtered, washed with acetic anhydride and n-hexane and dried to give 2 g. (72% by weight) of 3 - acetoxy - 3 - (3'-carbomethoxy-4'-acetoxy-1'-naphthyl) naphthalide as white crystals.

(2) A mixture of 108.9 g. (0.2 mole) of the 3-acetoxy naphthalide prepared above and 91.32 g. (0.2 mole) of 6-octadecyloxy-1-hydroxy-2-naphthoic acid in 1000 ml. methylethylketone and 2000 ml. acetonitrile was stirred and refluxed on a steam bath for one hour. The reaction was cooled to room temperature and filtered from insoluble material. The filtrate was evapoarted to dryness in vacuo to give 160 g. of solid.

(3) The solid was hydrolyzed in 500 ml. ethanol, 500 ml. water, and 250 ml., 50% sodium hydroxide with stirring on the steam bath for one and one-half hours. The green mixture was cooled in an ice bath and neutralized with 4N hydrochloric acid (about 1200 ml.) to approximately pH 1. The precipitate was filtered, washed well with water and dried to give 150 g. This material was triturated with 3500 ml. hot (about 100° C.) acetic acid and filtered, washed with acetic acid and n-hexane and dried to give 38 g. The acetic acid filtrate was treated with charcoal, filtered and left to stand overnight. The precipitate was filtered, washed with acetic acid and n-hexane and dried to give 38 g. of the title compound. Total yield 76 g. (46% by weight).

The 3-hydroxy-3-(3'-carbomethoxy-4'-hydroxy-1'-naphthyl)naphthalide employed in step (1) was prepared as follows:

A mixture of 6.7 g. (0.03315 moles) of 1-hydroxy-2-methylnaphthoate and 6.63 g. (0.03315 moles) of naphthalaldehydic acid in 90 ml. 12% p-toluene-sulfonic acid in acetic acid was stirred and refluxed overnight. The mixture was then cooled to room temperature. The solid was filtered, washed with acetic acid, then water, and dried. The solid thus obtained was recrystallized from 1400 ml. acetone and 200 ml. methanol (Norit) to give 11 g. (85% by weight) of the 1:1 adduct as white hair-like needles.

A mixture of the 1:1 adduct prepared above 600 g. (1.56 moles), and o-chloranil, 400 g. (1.63 moles) in 12,000 ml. dioxane, containing 188 g. (3.12 moles) acetic acid, was stirred and refluxed for 17 hours. At this point, 50 ml. water was added, and stirring and refluxing was continued for an additional 3 hours. The dark solution was then evaporated in vacuo to dryness. The residue was triturated well with ether, and the solid was filtered and washed well with ether, to give 432 g. (69% by weight) of 3-hydroxy-3-(3'-carbomethoxy-4'-hydroxy-1'-naphthyl)naphthalide.

The 1-hydroxy-6-octadecyloxy-2-naphthoic acid employed in step (2) above was prepared by adding sodium methoxide (67.4 gms., 1.35 mole) to a solution of 1,6-dihydroxy-naphthalene (100 gms., 0.625 mole) in 900 ml. of dry N,N-dimethyl-formamide saturated with dry carbon dioxide gas. A steady flow of carbon dioxide was maintained throughout the reaction. Approximately 125 ml. of dimethylformamide was distilled and the mixture was then refluxed for 15 minutes and an additional 125 ml. of solvent removed. The solution was cooled and the flow of carbon dioxide stopped. The reaction mixture was acidified with concentrated hydrochloric acid and then poured onto about 2000 gms. of ice. The precipitated dark solid was filtered and dried and then triturated with 1 liter of boiling benzene and filtered free of dark impurities. Recrystallization from water gave 1,6-dihydroxy-2-naphthoic acid as a white solid (melting range 220°–221° C.).

To a well-stirred slurry of 1,6-dihydroxy-2-naphthoic acid (5.1 gms., 0.025 mole) in 50 ml. of dry isopropyl alcohol under nitrogen was added potassium t-butoxide (5.65 gms., 0.050 mole). The mixture was heated to reflux and stirred 10–15 minutes and then octadecyl bromide (8.35 gms., 0.025 mole) was added. The reaction was refluxed for 5 hours, cooled and acidified with 20% hydrochloric acid. The solid which precipitated was filtered and dried and recrystallized from absolute ethanol to give 3.8 gms. of grey solid. Further recrystallization from chloroform gave 2.3 gms. of 1-hydroxy-6-octadecyloxy-2-naphthoic acid as a white solid (melting range 164°–165° C.).

The indicator dyes produced in accordance with the present invention may be employed in analytical procedures where phthalein indicators are commonly used, for example, to measure changes in pH value and find other uses as well. As discussed above, it has been found that a selectively exposed photosensitive material having a latent image therein may be processed in the presence of extraneous incident radiation actinic thereto by reason of the protection afforded by suitably positioning with respect to the exposure surface of the photosensitive layer an effective concentration of a selected dye or dyes as optical filter agents. The use of indicator dyes derived from phenolic compounds including certain naphthol naphthalides as optical filter agents for protecting photosensitive materials from radiation in the longer wavelength region of the visible spectrum forms the subject matter of application Ser. No. 103,392 of Myron S. Simon and David P. Waller filed Jan. 4, 1971, now U.S. Pat. No. 3,702,245 issued Nov. 7, 1972.

Since certain changes may be made in the above process and product without departing from the scope of the invention herein involved, it is intended that all matter contained in the above description shall be interpreted as illustrative and not in a limting sense.

What is claimed is:

1. A method of preparing a naphthalide indicator dye which comprises
   (A) reacting a solution of (a) a 3-acetoxy-3-(4'-acetoxy-1'-naphthyl)naphthalide and (b) a 1-naphthol in inert organic media to form the corresponding 3-(4'-acetoxy-1'-naphthyl)-3-(4'-hydroxy-1'-naphthyl)naphthalide and
   (B) converting said 4'-acetoxy group to a hydroxy group to form the corresponding 3,3-disubstituted naphthalide wherein said 3,3 substituents are 4'-hydroxy-1'-naphthyl radicals.

2. A method as defined in claim 1 wherein said (A) is 3-acetoxy-3-(3'-COOR-4'-acetoxy-1'-naphthyl)naphthalide and said R is selected from hydrogen and alkyl.

3. A method as defined in claim 2 wherein said R is alkyl.

4. A method as defined in claim 3 wherein said 1-naphthol is a 2-carboxy-1-naphthol.

5. A method as defined in claim 4 wherein said (A) is 3-acetoxy-3-(3'-carbomethoxy-4'-acetoxy-1'-naphthyl)naphthalide and said 1-naphthol is 2-carboxy-6-octadecyloxy-1-naphthol.

6. A method as defined in claim 1 which includes the additional step of reacting a 3-hydroxy-3-(4'-hydroxy-1'-naphthyl)naphthalide with acetic anhydride in the presence of a catalytic amount of pyridine to form said 3-acetoxy-(4'-acetoxy-1'-naphthyl)naphthalide (A).

7. A method as defined in claim 6 wherein said 3-hydroxy-3-(4'-hydroxy-1'-naphthyl)naphthalide is 3-hydroxy-3-(3'-COOR-4'-hydroxy-1'-naphthyl)naphthalide wherein R is hydrogen or alkyl.

8. A method as defined in claim 7 wherein said 3-hydroxy-3-(4'-hydroxy-1'-naphthyl)naphthalide is 3-hydroxy-3-(3'-carbomethoxy-4'-hydroxy-1'-naphthyl)naphthalide.

9. A compound of the formula:

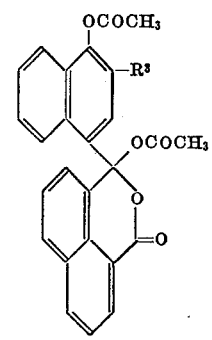

wherein R³ is selected from hydrogen; —OH;

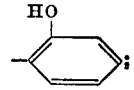

—C(CF₃)₂OH; —COOR wherein R is hydrogen or alkyl containing 1 to 20 carbon atoms; —NH—SO₂—R' and —SO₂—NH—R'' wherein R' and R'' each is a group containing up to 20 carbon atoms selected from alkyl, phenyl, naphthyl, phenyl substituted with alkyl and alkyl substituted with phenyl.

10. A compound as defined in claim 9 wherein $R^3$ is —COOR.

11. A compound as defined in claim 10 wherein R is alkyl.

12. 3 - acetoxy - 3 - (3' - carbomethoxy - 4' - acetoxy-1'-naphthyl)naphthalide-1,8.

References Cited

Awad et al.: J. Org. Chem., vol. 25 (1960), pp. 1872–74.

HENRY R. JILES, Primary Examiner

M. A. M. CROWDER, Assistant Examiner